US009268198B2

(12) United States Patent
Fong

(10) Patent No.: US 9,268,198 B2
(45) Date of Patent: Feb. 23, 2016

(54) LIGHT DIFFUSER ADAPTER

(71) Applicant: GARY FONG PHOTOGRAPHIC, INC., Kelowna (CA)

(72) Inventor: Gary M. Fong, Kelowna (CA)

(73) Assignee: Gary Fong Photographic, Inc., Kelowna (CA)

( * ) Notice: Subject to any disclaimer, the term of this patent is extended or adjusted under 35 U.S.C. 154(b) by 213 days.

(21) Appl. No.: 14/148,577

(22) Filed: Jan. 6, 2014

(65) Prior Publication Data

US 2015/0192837 A1 Jul. 9, 2015

(51) Int. Cl.
*G03B 15/02* (2006.01)
*G03B 15/06* (2006.01)

(52) U.S. Cl.
CPC ............. *G03B 15/02* (2013.01); *G03B 15/06* (2013.01)

(58) Field of Classification Search
CPC .................. G03B 15/12; G03B 15/06

USPC .................................................. 362/16, 355
See application file for complete search history.

(56) References Cited

U.S. PATENT DOCUMENTS

| 904,362 | A | * | 11/1908 | Robbins | ........... | G03B 15/05 362/16 |
| 2008/0310140 | A1 | * | 12/2008 | Capozzi | ........... | G03B 15/02 362/16 |
| 2014/0085906 | A1 | * | 3/2014 | Keogan | ........... | F21S 8/02 362/355 |

* cited by examiner

*Primary Examiner* — David V Bruce
(74) *Attorney, Agent, or Firm* — Lewis Roca Rothgerber Christie LLP

(57) ABSTRACT

An adapter configured to be coupled to a light diffuser, the adapter including a base comprising a bottom wall having an opening and a plurality of side walls extending from the bottom wall in a first direction, wherein the base is configured to accommodate a light diffuser; and a coupling portion extending from the base, the coupling portion having a protrusion extending therefrom in a second direction opposite to the first direction, the protrusion configured to couple the adapter to a light source assembly.

11 Claims, 7 Drawing Sheets

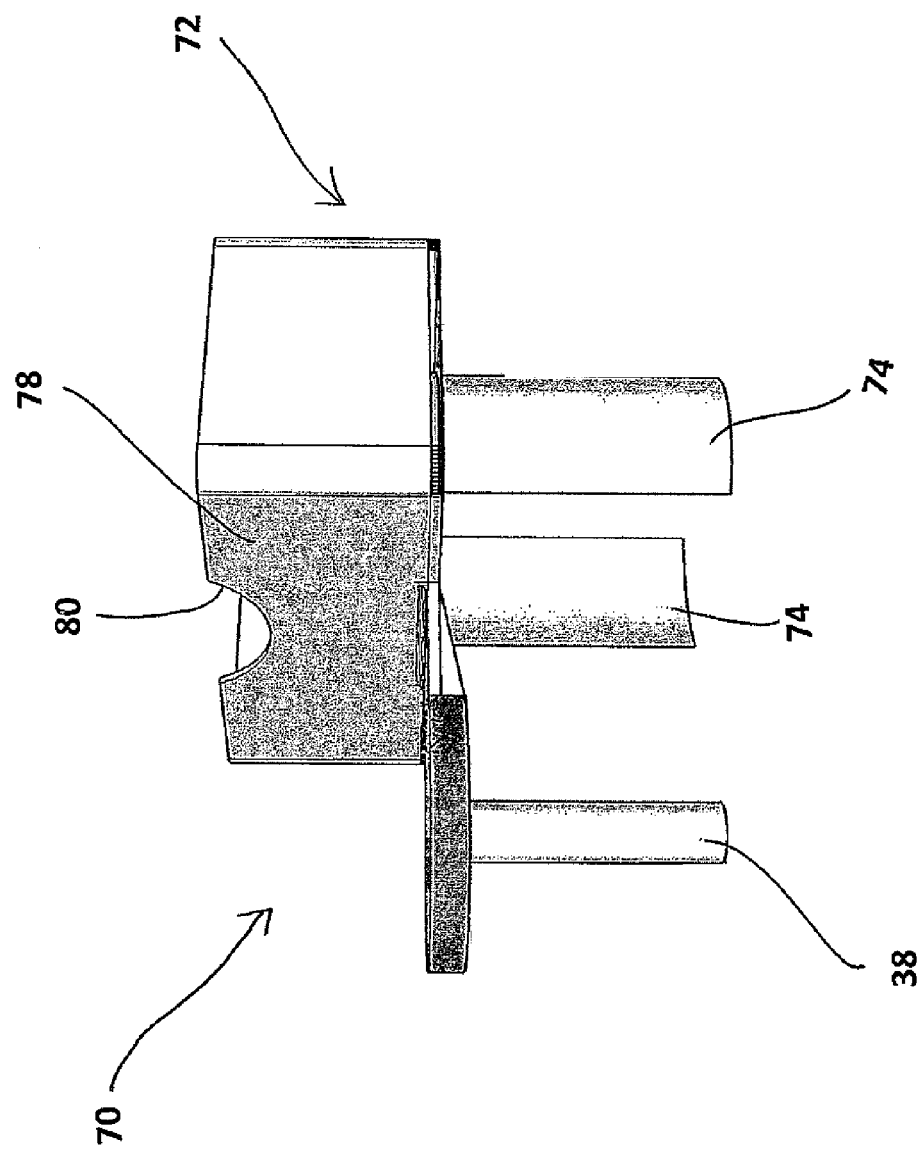

LIGHT DIFFUSER ADAPTER

FIELD OF THE INVENTION

Embodiments of the present invention are directed to an adapter for a light diffuser.

BACKGROUND

Light diffusing accessories are used in photography and videography to provide light-altering effects, such as softened lighting or colored lighting in photographs or videos. Often, such light diffusion or alteration is provided by stationary screens, umbrellas, soft boxes, and the like. While such devices provide sufficient lighting effects in fixed studio settings where the burden of transporting the lighting equipment from place to place is minimal, such lighting equipment is often large and cumbersome and therefore not easy to transport from place to place for photographers who travel with their equipment.

To relieve the burden of packing and transporting large light-altering equipment to various sites, portable light diffusers which can be mounted directly to a camera flash are sometimes used. Portable light diffusers are significantly smaller than most large studio lighting equipment, yet can provide substantially the same effects. However, when a light source other than a standard camera flash is used, the light source assembly may not be configured to accommodate a portable light diffuser because such light sources are typically used with light diffusers that are not attached to the light source assembly. As such, there is a desire to be able to securely and effectively couple a light diffuser or other light-altering device to such a light source assembly.

SUMMARY OF THE INVENTION

Embodiments of the present invention are directed to an adapter configured to accommodate a light diffuser and be coupled to light source assembly, particularly a light source assembly that is not typically directly coupled to a camera. Particularly, the adapter may be used to accommodate a light diffuser onto a studio light source assembly, wherein such studio light source assembly may use incandescent bulbs, LED bulbs, or other bulbs that can be easily replaced or switched out from the light source assembly.

In one embodiment, an adapter includes a base comprising a bottom wall having an opening and a plurality of side walls extending from the bottom wall in a first direction, wherein the base is configured to accommodate a light diffuser; and a coupling portion extending from the base, the coupling portion having a protrusion extending therefrom in a second direction opposite to the first direction, the protrusion configured to couple the adapter to a light source assembly.

In one embodiment, the base further comprises an arm extending in the second direction and configured to contact the light source assembly. The arm may have a concave surface configured to contact the light source assembly. Further, the arm may extend from a periphery of the opening of the base.

In one embodiment, the base is substantially rectangular and at least one of the side walls may have a notch thereon. Further, in one embodiment, the adapter is configured to be coupled to the light source assembly by an interference fit and the adapter is configured to be coupled to the light source assembly while a light source is in the light source assembly.

BRIEF DESCRIPTION OF THE DRAWINGS

FIG. 7 is a side perspective view of the adapter of FIG. 6.

DETAILED DESCRIPTION OF THE INVENTION

In general, embodiments of the present invention provide an adapter configured to accommodate a light source therein and configured to be used in combination with a light diffuser, for example, a photographic or videographic light diffuser. The adapter allows a user to mount a diffuser onto a preexisting light source assembly which typically includes a light source and a support structure for the light source. Particularly, the adapter may be used where the light source assembly is not a standard camera flash attached to a camera, but rather a light source assembly that is typically used for studio lighting, i.e., a light source that is separate from or spaced by a significant distance from the camera. The adapter allows the diffuser to be securely mounted onto the light source assembly without any additional tools or equipment and is sized to be easily portable and lightweight for convenience.

Figure 4:
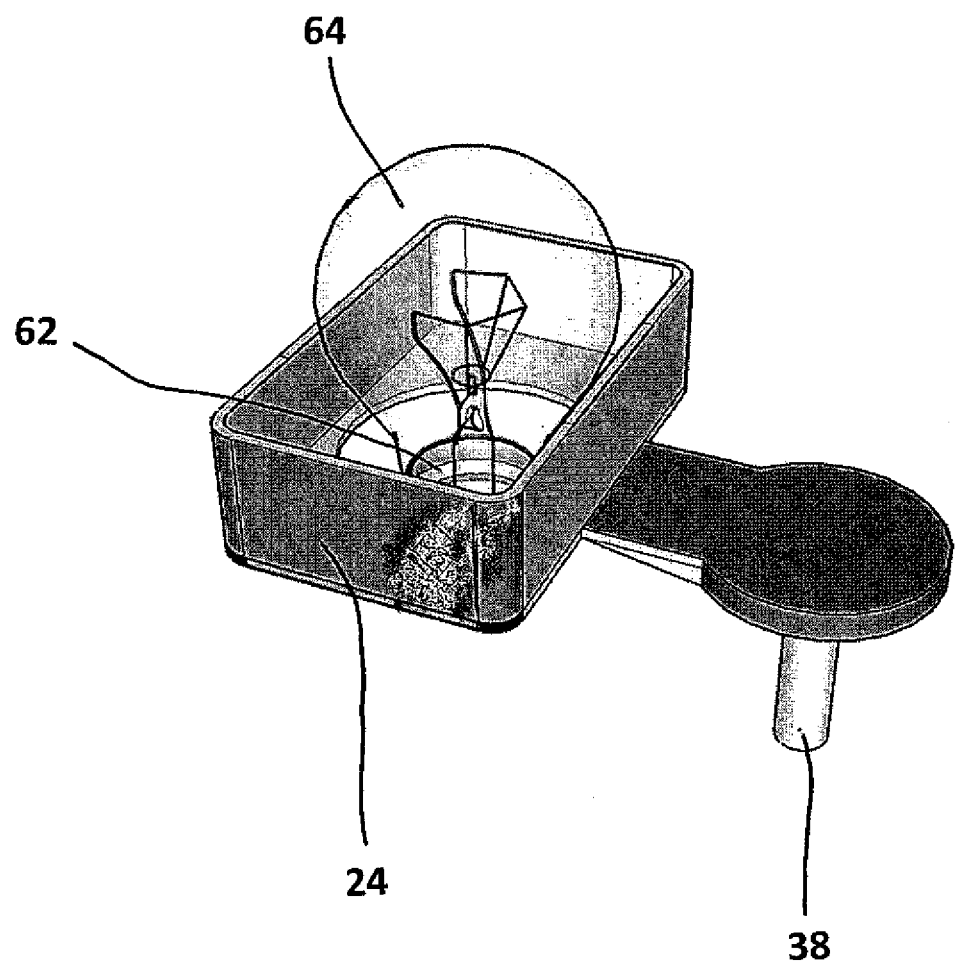
FIG. 4 is a perspective view of the adapter of FIG. 1 accommodating a light source.
Figure 5:
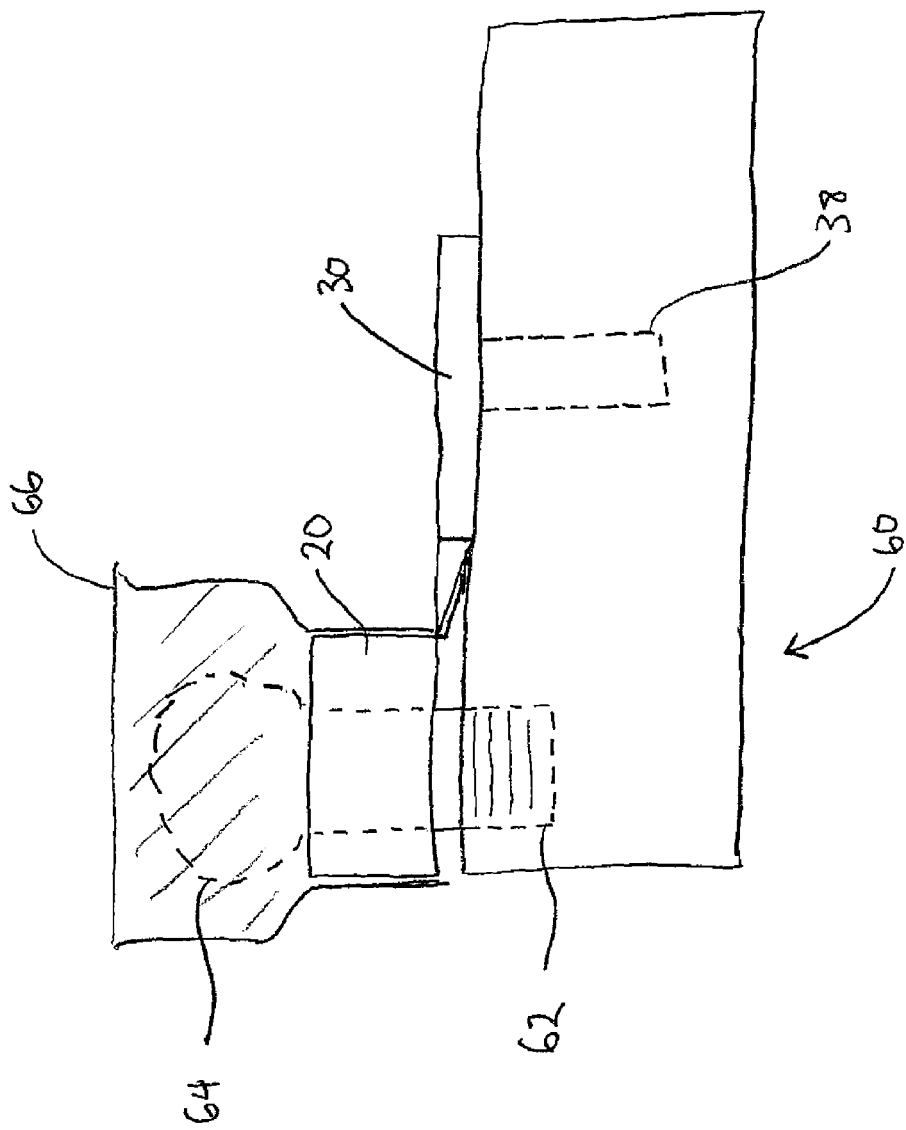
FIG. 5 is a schematic cross-sectional view of the adapter of FIG. 1 accommodating a light source and coupled to a light source assembly.

With reference now to FIGS. 1 to 5, the adapter 10 generally includes a base 20 configured to accommodate a light diffuser 66 and a coupling portion 30 configured to couple the adapter to a light source assembly 60 (FIG. 5).

In one embodiment, the adapter 10 is formed from plastics using an injection molding process. However, the adapter 10 may also be made from other molding and non-molding plastic forming processes, as well as from other relatively rigid materials, such as metal. Further, in one embodiment, the adapter 10 may be integral as a single piece, but in other embodiments, the adapter may be made in separate pieces that are coupled together.

In one embodiment, the adapter 10 is configured to accommodate a photographic light diffuser 66 such as the portable light diffuser described in U.S. Pat. No. 7,946,719, the subject matter of which is incorporated herein by reference. By being configured to be used with a portable light diffuser, the adapter allows heavier and more cumbersome equipment, such as large umbrellas, to be eliminated or minimized. Although the adapter 10 is configured to be used with the exemplary portable light diffuser 66 as described in more detail below, it will be apparent to those skilled in the art that the present invention is not limited to be used with the described light diffuser, but rather can be used with various different diffusers or other light-altering components.

Figure 1:
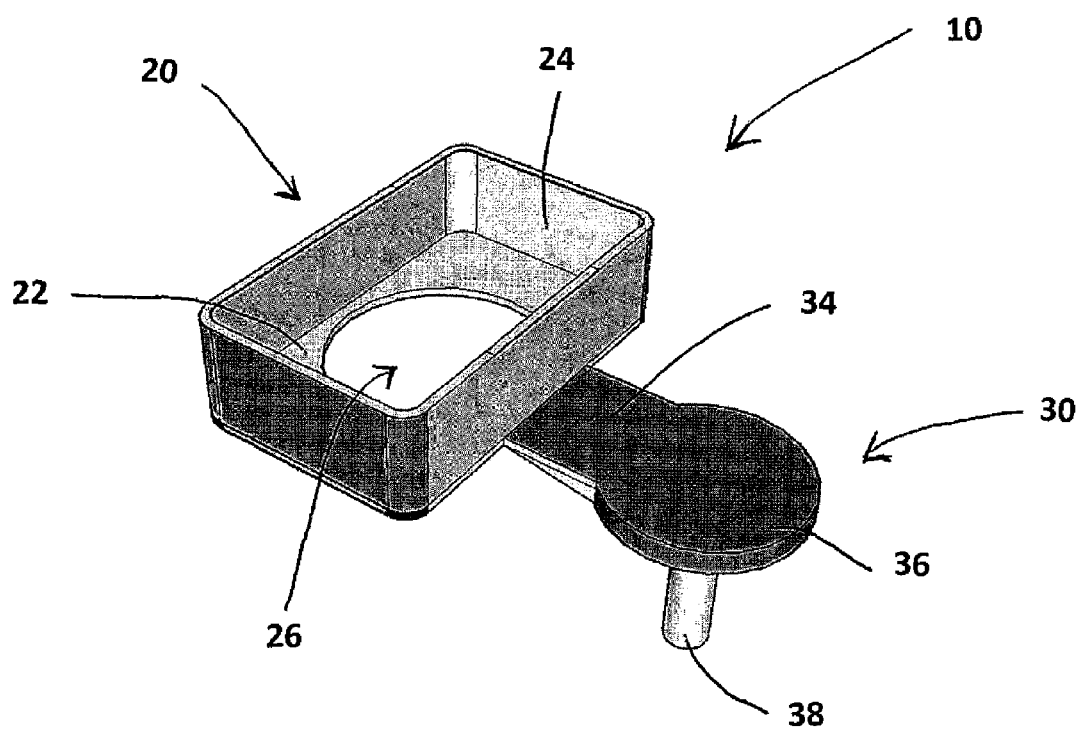
FIG. 1 is a perspective view of an embodiment of an adapter of the present invention.
Figure 2:
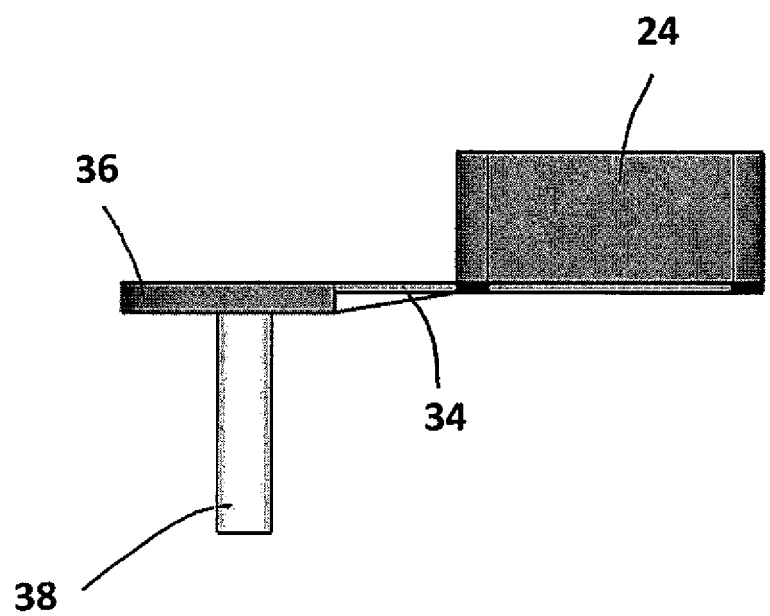
FIG. 2 is a side view of the adapter of FIG. 1.
Figure 3:
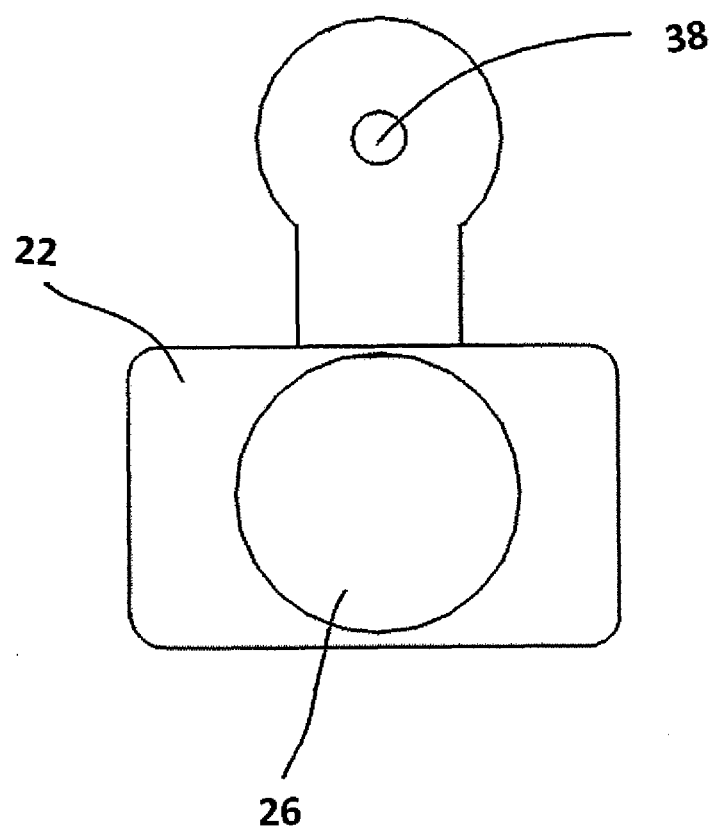
FIG. 3 is a bottom view of the adapter of FIG. 1.

The base 20 of the adapter 10 includes a bottom wall 22 and a plurality of side walls 24 extending from an edge of the bottom wall. In one embodiment, the base 20 is substantially rectangular in order to accommodate a light diffuser with a rectangular base. As shown in FIG. 1, the base 20 may have generally rounded corners to match rounded corners of the light diffuser base. However, it will be appreciated that a shape of the base 20 is not limited to being rectangular, but rather, can be provided in any appropriate shape to accommodate various diffusers depending on the shape of the diffuser base.

The base 20 is generally configured to have dimensions to accommodate a light diffuser base such that the diffuser can be supported and held thereon by an interference fit. Further, the base 20 may be dimensioned such that the base does not substantially interfere with a light source 62 already located on a light source assembly 60, as described in more detail below. Specifically, in one embodiment, the base 20 has a length from about 1.5 inches to about 5 inches, a width from about 1 inch to about 2.5 inches and a height of between about 0.5 inch and 2 inches, but it will be appreciated that the dimensions of the base 20 are not limited thereto.

In one embodiment, the bottom wall 22 has an opening 26 that is configured to be aligned with and expose a light source electrical socket 62 on the light source assembly 60, as shown in FIGS. 4 and 5, when the adapter 10 is coupled to the light source assembly 60. Further, in one embodiment, the opening 26 is dimensioned to allow the adapter 10 to be inserted over a light source that is already electrically coupled to the socket 62 such that the light source does not have to be removed in order to accommodate the adapter. In one embodiment, the opening may have a diameter that is slightly less than a width of the base 20. Specifically, the diameter may be between about 1 inch and 2.5 inches, but is not limited thereto.

The coupling portion 30 extends from a side edge of the base 20 and is configured to couple the adapter 10 to the light source assembly 60 and support the adapter when the adapter is coupled to the light source assembly. In one embodiment, the coupling portion 30 includes a coupling arm 32 extending from the base 20 and a protrusion 38 extending from the coupling arm and configured to engage the light source assembly 60.

In one embodiment, the coupling arm 32 has a proximate portion 34 contacting the base and a distal portion 36 distal to the base 20 from the proximate portion. Further, in one embodiment, the proximate portion has a gradually increasing thickness in a direction away from the base 20 and towards the distal portion 36 to support the coupling portion 30. Additionally, in one embodiment, the distal portion 36 is generally planar and has a substantially constant thickness.

The protrusion 38 extends from a surface of the distal portion in a direction opposite to a direction in which the base 20 extends from the coupling portion 36. The protrusion 38 serves to couple the adapter 10 to the light source assembly 60. Particularly, in one embodiment the protrusion 38 is a cylindrical rod configured to fit into an opening in the light source assembly 60 that typically accommodates a photographic umbrella base. The protrusion 38 can be coupled to the light source assembly 60 by an interference fit or by other coupling mechanisms as available or desired. In one embodiment, the protrusion 38 may have a diameter of between about 0.125 inches and about 1 inch and a length of between about 1 inch and 6 inches. However, as will be appreciated, the present invention is not limited to the specific dimensions listed herein.

With reference particularly to FIGS. 4 and 5, in use, the protrusion 38 is inserted into an opening in the light source assembly 60 to couple the adapter 10 to the light source assembly. Simultaneously, the base 20 can be oriented such that the opening 26 in the base exposes an electrical socket 62 for a light source 64 of the light source assembly. The light source can be any light source that can be accommodated into the light source assembly, for example, a flash bulb, an LED bulb, an incandescent bulb, or any other suitable light source. As noted above, the opening 26 in the base 20 can be sized larger than the socket 62 such that the adapter 10 can slide over a light source already coupled to the socket. Once the adapter is coupled to the light source assembly 60 and oriented such that the light source 64 extends through the opening 26 in the base 20, the diffuser 66 can be coupled by an interference fit to the base 20 of the adapter 10. Of course, it will be appreciated that the diffuser 66 could also be coupled to the base 20 before the adapter 10 is coupled to the light source assembly 60.

Figure 6:
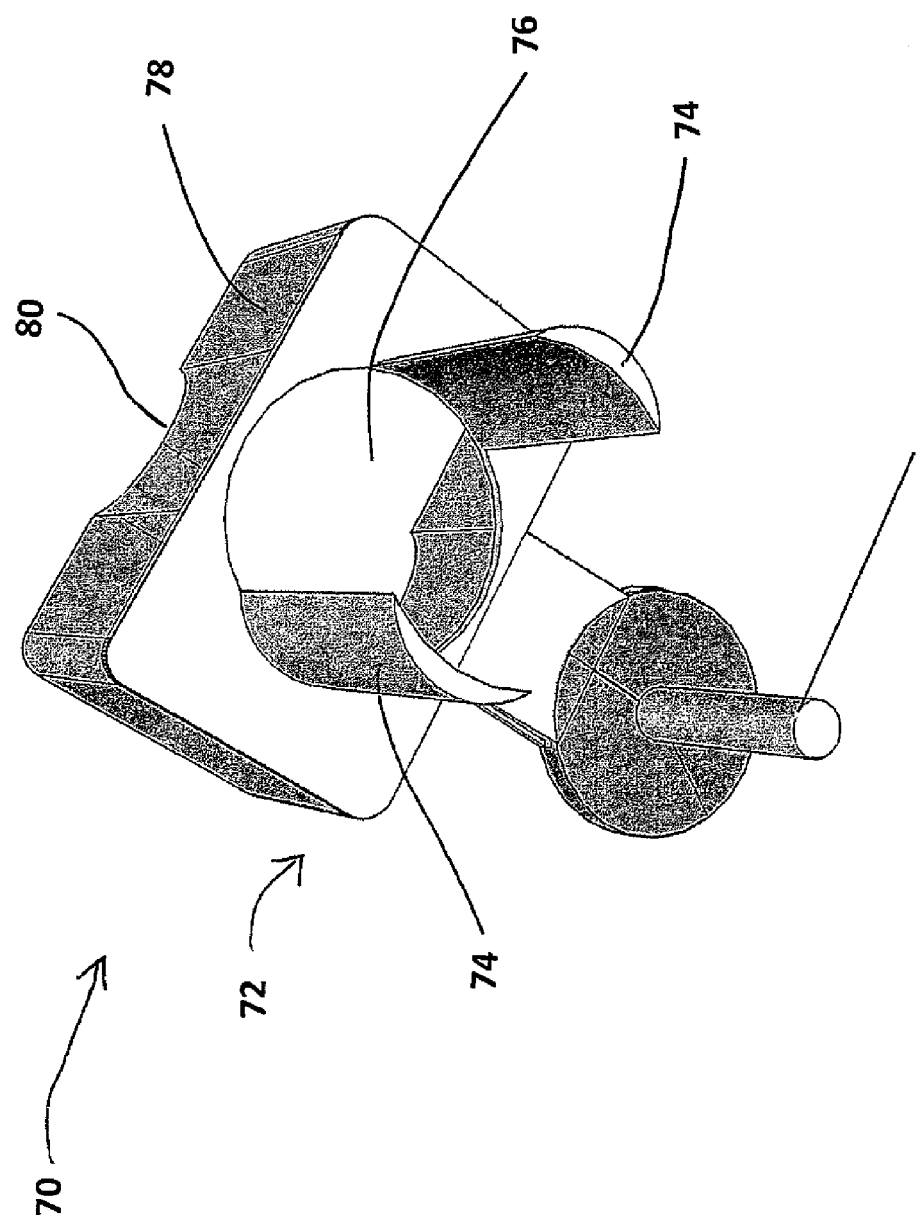
FIG. 6 is a perspective view of a lower side of another embodiment of an adapter of the present invention.

With reference now to FIGS. 6 and 7, another embodiment of an adapter 70 is shown. Because some of the aspects of the adapter 70 are similar to the embodiments of the adapter 10 shown in FIGS. 1-5, only the main differences will be discussed in detail.

As shown in FIGS. 6 and 7, a base 72 of the adapter 70 includes a pair of arms 74 extending from a portion of a periphery of an opening 76 of the base. The arms 74 are configured to extend around a portion of the light source assembly 60 to provide additional support to the base 72, and particularly to prevent the base from moving or wobbling with respect to the light source assembly 60. As shown, the arms 74 extend in the same direction as the protrusion 38 and have a concave surface which allows for greater surface area contact against a circular light source assembly 60. As will be appreciated, however, the arms 74 can also be other configurations, such as planar, depending on the shape of the light source assembly. In one embodiment, a height of the arms 74 is substantially equal to a height of the protrusion 38, but the height of the arms is not limited thereto. Additionally, in one embodiment, the arms 74 are integral as a single piece with the base 72, but it will be appreciated that the arms could be made separately and attached to the base.

With continued reference to FIGS. 6 and 7, at least one side wall 78 of the base 72 has a notch 80 thereon to provide additional support and resistance against bending or deformation. In one embodiment, the notch 80 is located on an upper edge of the side wall 78 and is semi-circular, but the location and shape of the notch are not limited thereto. Additionally, each side wall 78 of the base 72 could include the notch 80.

Although the adapter according to exemplary embodiments of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. An adapter configured to be coupled to a light diffuser, the adapter comprising:
   a base comprising a bottom wall having an opening and a plurality of side walls extending from the bottom wall in a first direction, wherein the base is configured to accommodate a light diffuser; and
   a coupling portion extending from the base, the coupling portion having a protrusion extending therefrom in a second direction opposite to the first direction, the protrusion configured to couple the adapter to a light source assembly.

2. The adapter of claim 1, wherein the base further comprises an arm extending in the second direction and configured to contact the light source assembly.

3. The adapter of claim 2, wherein the arm has a concave surface configured to contact the light source assembly.

4. The adapter of claim 2, wherein the arm extends from a periphery of the opening of the base.

5. The adapter of claim 2, wherein the arm comprises a plurality of arms.

6. The adapter of claim 1, wherein the base is substantially rectangular.

7. The adapter of claim 1, wherein at least one of the side walls has a notch thereon.

8. The adapter of claim 1, wherein the adapter is configured to be coupled to the light source assembly by an interference fit.

9. The adapter of claim 1, wherein the adapter is configured to be coupled to the light source assembly while a light source is in the light source assembly.

10. The adapter of claim 1, wherein the light source assembly is not configured to be directly coupled to a camera.

11. The adapter of claim 1, wherein a light source of the light source assembly is an incandescent bulb.

* * * * *